United States Patent [19]

Dodge

[11] Patent Number: 4,607,733
[45] Date of Patent: Aug. 26, 1986

[54] THROTTLE AND BRAKE CONTROL APPARATUS

[76] Inventor: Peter W. Dodge, 334 E. 9th St., New York, N.Y. 10003

[21] Appl. No.: 596,739

[22] Filed: Apr. 4, 1984

[51] Int. Cl.[4] ............................................. B60K 41/20
[52] U.S. Cl. ................................. 192/3 S; 192/3 TR; 74/489
[58] Field of Search ..................... 192/1, 2, 3 TR, 3 S, 192/13 A; 70/210, 211, 254, 255; 74/489, 506; 180/219; 280/289 L, 289 H; 123/198 B

[56] References Cited

U.S. PATENT DOCUMENTS

| 3,845,847 | 11/1974 | Camp | 192/3.5 |
| 4,133,193 | 1/1979 | Sanada et al. | 70/210 X |
| 4,286,699 | 9/1981 | Pawelka | 192/3 S |

FOREIGN PATENT DOCUMENTS 1803891  1/1970  Fed. Rep. of Germany ...... 192/3 S

Primary Examiner—George H. Krizmanich
Assistant Examiner—James J. Merek
Attorney, Agent, or Firm—Arthur I. Degenholtz

[57] ABSTRACT

A throttle and brake control apparatus is provided which enables an operator to control both the brake system and the throttle system of a vehicle by selectively rotating a single control member in a first and a second direction. The apparatus, according to the present invention, can be mounted on the handlebar of a motorcycle or a similar vehicle and replaces a conventional brake control system and a conventional throttle control system. The apparatus eliminates the need for conventional brake control levers.

20 Claims, 13 Drawing Figures

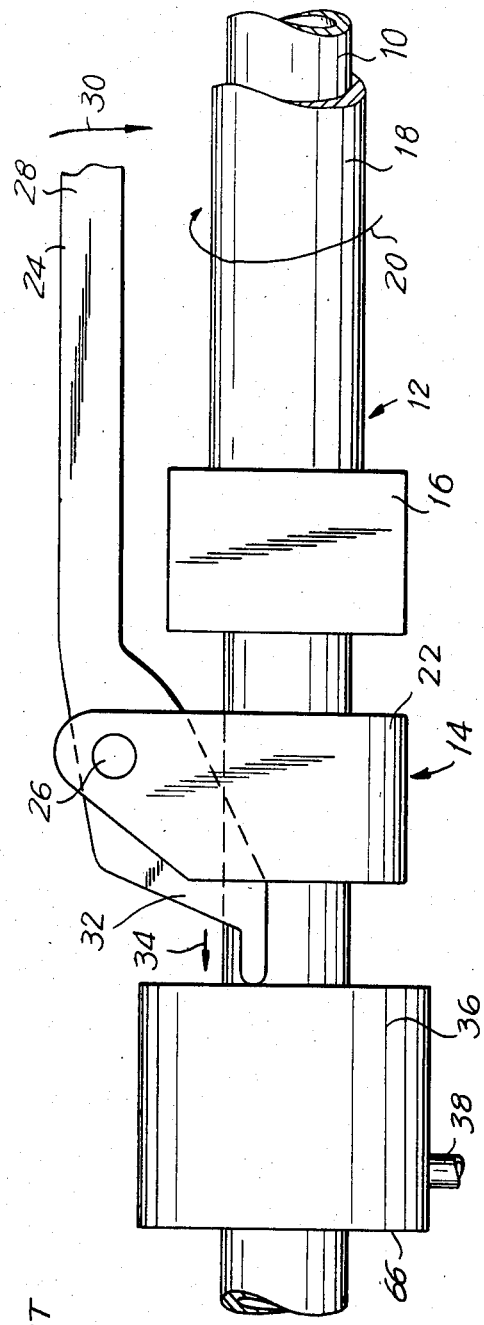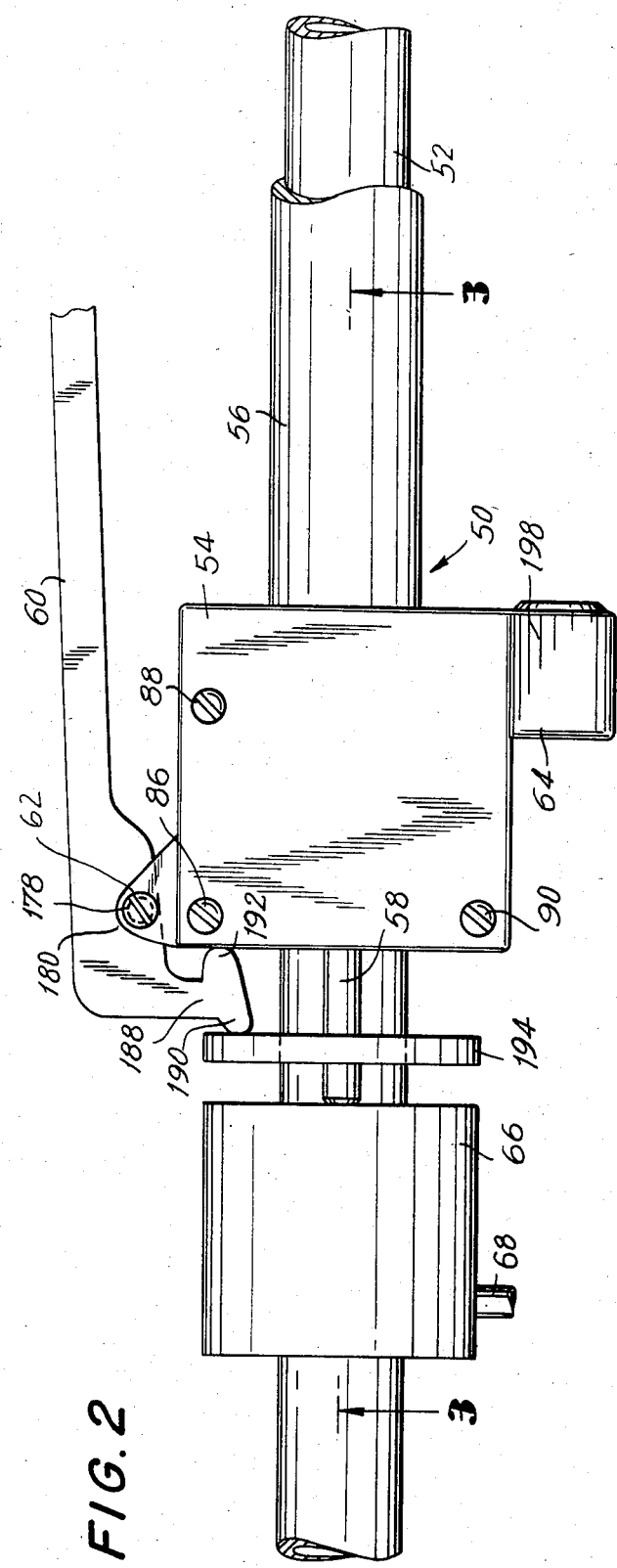
FIG. 1 PRIOR ART
FIG. 2

THROTTLE AND BRAKE CONTROL APPARATUS

BACKGROUND OF THE INVENTION

Conventional motorcycle handbrake assemblies comprise a brake lever which is pivotally mounted on the handlebar, and spaced a relatively small distance apart from the handlebar. The motorcycle brakes are actuated by an operator pulling on the brake lever in a direction tending to move the brake lever toward the handlebar, closing the space between the brake lever and the handlebar. On a conventional motorcycle, the throttle is actuated by means of a cylindrical control member or throttle grip which encircles a portion of the handlebar and which is located proximate to the brake lever.

The conventional handbrake assembly is subject to numerous disadvantages included among which are the following. In the normal mode of operation of the conventional handbrake assembly, the operator keeps his hand on the throttle grip with his fingers and thumb encircling the throttle and the operator rotates the throttle grip to achieve the desired operating speed. To effect a braking action, the operator conventionally straightens his fingers, reaches for and grasps the brake lever with his fingers and with his thumb still encircling the throttle grip, or the portion of the handlebar immediately adjacent to the throttle grip, moves his fingers toward his thumb, thereby squeezing the brake lever toward the throttle grip and actuating the brakes.

The need for the operator to effect the separate actions of straightening his fingers, reaching for the brake lever, grasping the brake lever and squeezing the brake lever toward the throttle grip inevitably causes a time delay which can adversely impact the overall safety of the motorcycle vehicle.

In an effort to overcome this reaction time problem, operators often resort to the expedient of leaving two fingers on the brake lever at all times and operating the throttle with the remaining three fingers. This result is the problem of trying to apply sufficient force in a relatively brief period to actuate the brake system. In addition, the brake lever, when depressed, can pinch the fingers holding the throttle grip. The need to constantly stretch two fingers to grasp the brake lever can also result in operator fatigue and a reduction in control over the handlebars and steering efficiency.

The initial spacing between the conventional brake lever and the handlebar, coupled with the requirement for an operator to squeeze the brake lever toward the handlebar in order to actuate the brakes, creates an inherent operating difficulty for operators having a smaller than average hand size. An operator having a smaller than average hand often must grasp the brake lever with the tips of his fingers, resulting in a marginal capability for squeezing the brake lever with sufficient force to effect optimum brake actuation.

Another disadvantage of the conventional brake lever assembly is related to the effect of momentum on the operator's body. The conventional brake lever is usually located slightly forward of the handlebar grips. During a braking action, as the motorcycle slows down, the forward momentum of the operator's body tends to keep him moving in the forward direction. In order to operate the conventional brake lever, the operator must squeeze the brake lever toward the handlebar thus moving the brake lever in a rearward direction. To accomplish this action, the operator must overcome the restoring force of the spring in the brake lever assembly and his own forward momentum which tends to throw him in a direction opposite to the direction which he is trying to apply a force. During non-emergency conditions, the brakes are usually applied in a smooth and gentle manner and the effect of momentum on the operator's body has a relatively small effect on the operator's ability to operate the brakes in an optimum manner. However, during emergency conditions, the brakes are applied abruptly and the momentum tends to throw the operator's body forward. During these emergency conditions the operator must apply force in a rearward direction while being thrown in a forward direction. Unless the operator has sufficient manual strength his hand may be thrown off the brake lever, possibly causing an accident In addition, the conventional brake lever assembly must be carefully located on the handlebar in order to enable an operator to reach both the brake lever and the throttle grip. This requirement creates limitations on the overall handlebar design.

Other disadvantages of the conventional brake lever assembly are related to the exposed nature of the conventional assembly. In the case of a major accident the exposed brake lever can act as a protuberance which can injure both the motorcycle operator and pedestrians who may be in the area. In the case of a minor accident, in which the motorcycle falls over, the brake lever can easily be bent or broken, resulting in a loss of braking capability.

OBJECTS OF THE INVENTION

It is an object of the present invention to overcome the disadvantages of the prior art and to provide a throttle and brake control apparatus which can be operated through the rotation of a single control grip member.

Another object of the present invention is to provide a throttle and brake control apparatus which eliminates the need for a pivotally mounted brake lever.

Another object of the present invention is to provide a throttle and brake control apparatus which can be operated safely by operators having a smaller than average hand.

Another object of the present invention is to provide a throttle and brake control apparatus which can be easily mounted on a motorcycle handlebar and does not present large protuberances projecting from the handlebar.

Another object of the present invention is to provide a throttle and brake control apparatus which can be used with conventional hydraulic master cylinders for brake actuation.

Another object of the present invention is to provide a throttle and brake control apparatus which can reduce the reaction time needed to apply the brakes in an emergency situation.

Another object of the present invention is to provide a throttle and brake control apparatus which can be used with a conventional control wire for throttle actuation.

Still another object of the present invention is to provide a throttle and brake control apparatus which comprises a relatively small number of component parts which are economical of manufacture resulting in a relatively low unit cost.

SUMMARY OF THE INVENTION

In accordance with the present invention, there is provided a throttle and brake control apparatus which can be mounted on the handlebar of a motorcycle. The apparatus includes a hollow housing which is clamped onto the motorcycle handlebar and a hollow control grip member which is rotationally mounted on the housing. The control grip member has a portion which encircles the motorcycle handlebar and a portion which projects into the hollow housing. A disk member having an arcuate slot is rotatably mounted on the control grip member within the housing and a brake cam member is rigidly connected to the control grip member. A conventional throttle control wire is attached to the periphery of the disk member.

The brake cam has a projecting pin which engages the arcuate slot in the disk member and a cam portion which drives a pin which is slideably mounted in the housing, when the cam member is rotated. The slideably mounted pin projects outwardly of the housing and bears against a conventional hydraulic master brake cylinder which is mounted on the motorcycle handlebar. Rotation of the control grip member in a first direction of rotation rotates the brake cam and causes the pin to bear against the hydraulic master brake cylinder thus applying the motorcycle brakes. During this rotation of the control grip member, the pin on the brake cam rides in the arcuate slot in the disk member and the disk member does not rotate.

Rotation of the control grip member in a second direction of rotation causes the pin on the brake cam to drive the disk member thereby applying tension to the throttle control wire and thereby actuating the throttle. During this rotation of the control grip member in the second direction of rotation, the slideably mounted pin rides along a flat portion of the brake cam and therefore does not actuate the hydraulic master brake cylinder.

The control of both the throttle and the brakes of the motorcycle are thus accomplished through the rotation of a single control grip member.

Additional optional features of the invention include a pivotally mounted brake lever which bears on a collar which is mounted on the sliding pin in order to operate the hydraulic master cylinder, and a lock assembly which engages the brake cam. The brake lever enables an operator to operate the motorcycle brakes in a conventional manner while becoming familiar with the operation of the control grip member for operation of the brakes and the throttle. The lock assembly provides a means for locking both the brakes and the throttle and prevents unauthorized use of the motorcycle.

BRIEF DESCRIPTION OF THE DRAWINGS

Additional objects and advantages of the invention will become apparent during the course of the following specification, when taken in connection with the drawings, in which:

FIG. 1 is a plan view of a conventional throttle control and a conventional brake control apparatus according to the prior art, with the apparatus shown installed on a motorcycle handlebar;

FIG. 2 is a plan view of a throttle and brake control apparatus, made in accordance with the present invention, with the apparatus shown installed on a motorcycle handlebar;

DETAILED DESCRIPTION OF THE INVENTION

Figure 3:
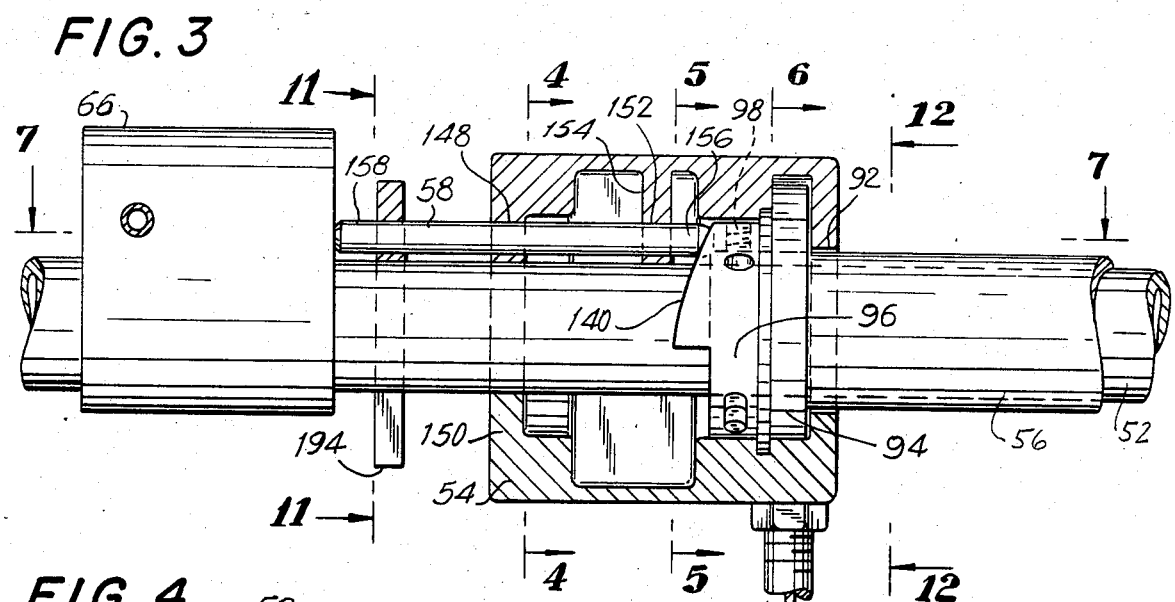
FIG. 3 is a cross sectional view taken along the line 3—3 of FIG. 2.

With reference to the drawings there is shown in FIG. 1 a portion of a motorcycle handlebar 10 on which there is mounted a conventional throttle control system 12 and a conventional brake control system 14. As is shown in FIG. 1, in the prior art, the throttle control system 12 and the brake control system 14 are independent systems which are mounted proximate to each other on the handlebar 10.

The conventional throttle control system 12 comprises a support member 16 which is mounted on the handlebar 10 and a control grip 18 which is rotationally mounted on the support member 16 and encircles the handlebar 10. Rotation of the control grip member 18 in the direction shown by the arrow 20 results in tension being placed on a control wire, which is not shown, and actuation of a throttle which is also not shown.

The conventional brake control system 14 comprises a support member 22 which is mounted on the handlebar 10 and on which a brake lever 24 is mounted by means of a pivot 26. When an operator moves the end 28 of the brake lever 24 in the direction shown by the arrow 30, the end 32 of the brake lever 24 moves in the general direction shown by the arrow 34 and depresses a spring loaded piston which is not shown on a hydraulic master cylinder 36 thereby actuating the brake system which is not shown through a system of hydraulic conduit line 38.

There is shown in FIG. 2 a throttle and brake control apparatus, 50 made in accordance with the present invention, with the apparatus shown mounted on a motorcycle handlebar 52. The apparatus 50 comprises a hollow housing 54, a control grip 56 and a pin member 58. FIG. 2 also shows a brake lever 60 which is mounted on the housing 54 by means of a pivot 62 and a lock assembly 64. The brake lever 60 and the lock assembly 64 are optional features of the invention 50 as will be presently described in detail. The pin member 58 is shown bearing a hydraulic master cylinder 66. The hydraulic master cylinder 66 is conventional in nature and will not be described in detail other than to indicate that pressure on a spring loaded piston, which is not shown, mounted in hydraulic master cylinder 66 by the pin member 58 causes the hydraulic master cylinder 66 to actuate the motorcycle brake system via the conduit 68 and pressure on the hydraulic master cylinder 66 is opposed by an internally mounted spring.

Figure 7:
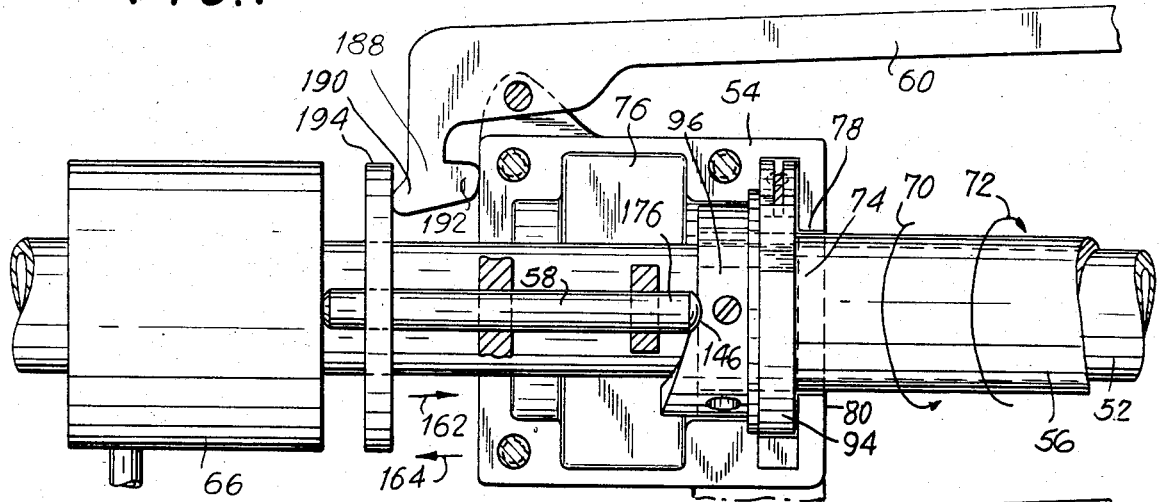
FIG. 7 is a cross sectional view taken along the line 7—7 of FIG. 3; showing the brake control in an unactuated state.
Figure 9:
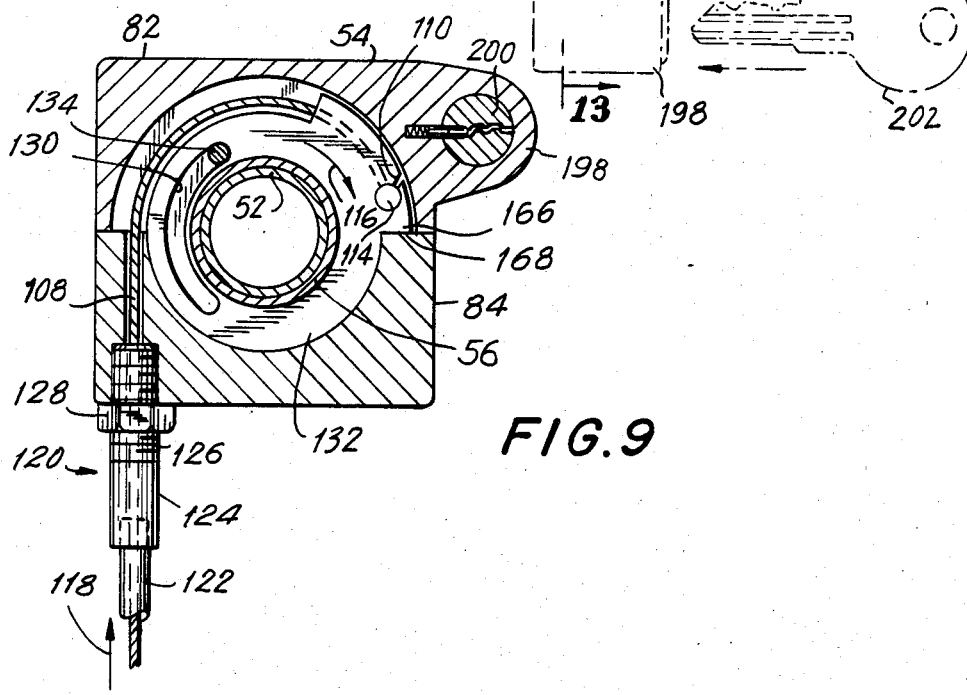
FIG. 9 is a cross sectional view similar to FIG. 6 showing the throttle in an actuated state.

The internal construction and the principles of operation of the apparatus 50 according to the present invention are best shown in FIG. 3, through 9. As shown in FIG. 7, the control grip 56 is a hollow tubular member, through which the handlebar 52 passes. The control grip 56 may rotate relative to the handlebar 52 in the direction shown by the arrows 70,72. The end 74 of the control grip 56 projects into the interior 76 of the housing 54 via a hole 78 formed in the wall 80 of the housing 54.

Figure 4:
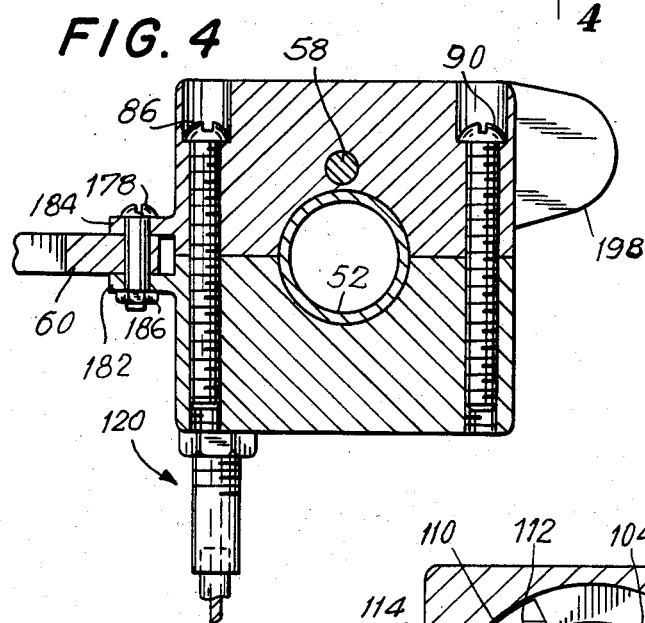
FIG. 4 is a cross sectional view taken along the line 4—4 of FIG. 3.
Figure 5:
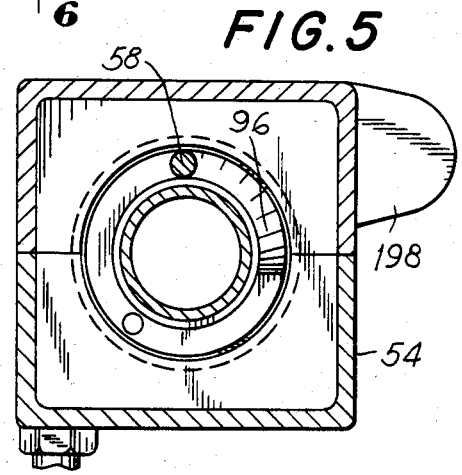
FIG. 5 is a cross sectional view taken along the line 5—5 of FIG. 3.

The housing 54 is a hollow assembly which includes an upper half, 82 a lower half 84 and three screws 86,88,90 which attach the upper and lower housing halves together. The housing 54 is proportioned so that tightening the screws 86,88,90 clamps the housing 54 securely onto the handle bar 52 as is shown in FIG. 4. The portion of the housing 54 adjacent to the control grip 56 is proportioned so that there exists a small space 92 between the housing 54 and the control grip 56 as is shown in FIG. 3 thus enabling the control grip 56 to rotate relative to the housing 54.

A disk member 94 is rotatably mounted on the control grip, 56 proximate to the end 74. A brake cam 96 is mounted on the end 74 of the control grip 56 and is secured to the control grip 56 for rotation with the control grip 56 by means of a screw set, which is not shown, and which engages the threaded hole 98 and bears against the control grip 56. The disk 94 member and the brake cam 96 cooperate to form the major operating elements of the apparatus 50 and these members will be presently described in detail.

Figure 6:
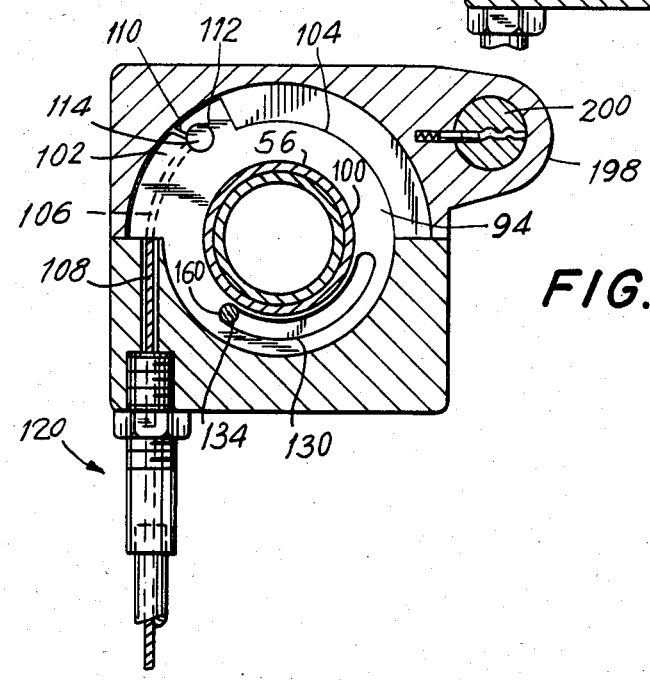
FIG. 6 is a cross sectional view taken along the line 6—6 of FIG. 3.

The disk member 94 is best shown in FIG. 6 and includes a central hole 100 which loosely fits on the control grip 56 enabling the disk member 94 to rotate relative to the control grip 56. The disk member 94 includes a sector 102 which has a radius larger than the radius of the remaining portion 104 of the disk. The sector 102 includes a first slot 106 which is proportioned to accept a control wire 108 as is shown in FIGS. 6-9. The sector 102 also includes a radial slot 110 and a transverse hole 112 which are proportioned to accept a cylindrical bar or end fitting 114 which is attached to the end of the control wire 108. The slot 110 and the hole 112 securely engage the cylindrical bar 114 so that rotation of the disk member 94 in the direction indicated by the arrow 116 in FIG. 9 pulls the control wire 108 as is indicated by the arrow, 118 also in FIG. 9.

The control wire 108 leads to the throttle and is part of a control wire assembly 120 which includes a sheath member 122 and a cylindrical end fitting 124 which has a threaded portion 126 which engages the housing 54 and which is secured by a nut 128. The control wire assembly 120 is conventional in nature and need not be further described.

Figure 10:
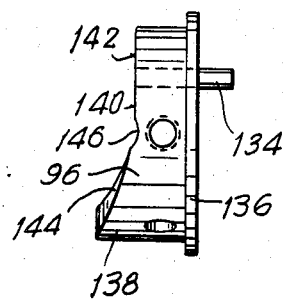
FIG. 10 is a side elevation view of the brake cam member shown removed from the apparatus.
Figure 11:
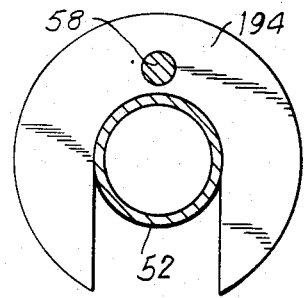
FIG. 11 is a cross sectional view taken along the line 11—11 of FIG. 3.

The disk 94 also includes an arcuate slot 130 formed in the surface 132. The arcuate slot 130 is proportioned to accept a pin 134 which projects from the surface 136 of the brake cam 96 as is shown in FIG. 10. The disk 94 may be made of a material exhibiting a generally low coefficient of friction, such as any one of a number of rigid plastic materials.

The brake cam 96 is shown removed from the apparatus in FIG. 10 and includes the pin 134 which projects from the surface 136. The surface 138 of the brake cam 96 is generally cylindrical and the surface 140 contains the cam profile. The surface 140 comprises a flat portion 142 and an inclined portion 144 which slopes away from the flat portion 142 and a detent portion 146 disposed between the flat 142 and the inclined portion 144.

Figure 8:
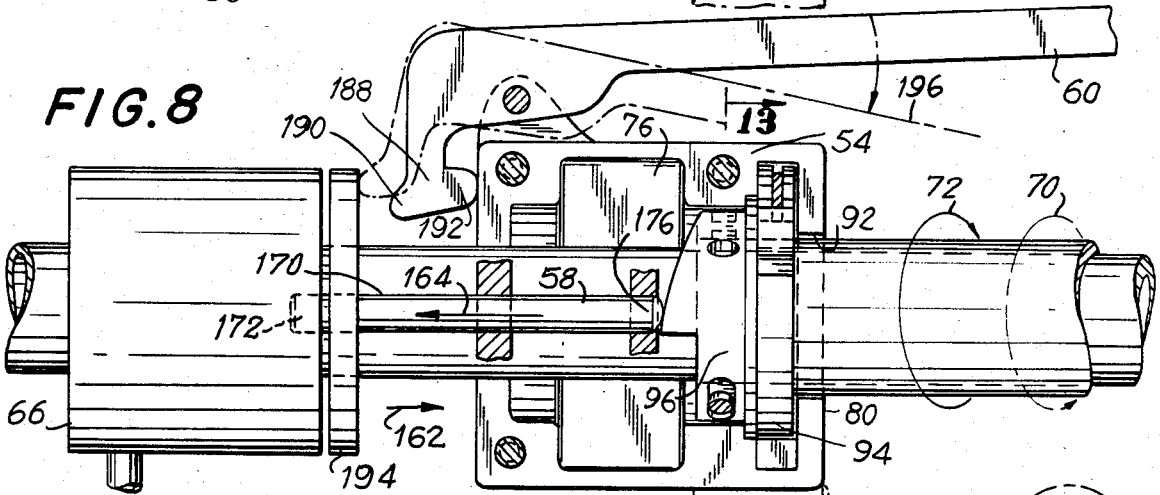
FIG. 8 is a cross sectional view similar to FIG. 7 showing the brake control in an actuated state.

As is shown in FIGS. 3, 7, and 8 the pin member 58 is slideably mounted in a hole 148 which is formed in the wall 150 and a hole 152 which is formed in a projection, 154 both of which are part of the housing 54. The end 156 of the pin 58 bears against the surface 140 of the brake cam 96 and the end 158 of the pin 58 projects outwardly with respect to the housing 54 and bears against the hydraulic master cylinder 66.

During operation of the apparatus, when an operator rotates the control grip 56 in the direction indicated by the arrow 70 in FIG. 7 the brake cam 96 rotates with the control grip 56 and the pin 134 pushes against the end 160 of the arcuate slot 130 in the disk 94 and rotates the disk 94 from the position shown in FIG. 6 to the position shown in FIG. 9. The rotation of the disk 94 pulls on the control wire 108 overcoming a throttle spring, which is not shown, thereby opening the throttle. When the control grip 56 is rotated in the direction indicated by the arrow 72 the end 156 of the pin 58 rides along the flat portion 142 of the brake cam 96 and the pin 58 does not move in either of the directions indicated by the arrows 162,164 in FIG. 7. When the control grip 56 is released, a throttle spring, which is not shown, located at the throttle, pulls on the control wire 108 and returns the disk 94 to the position shown in FIG. 6. The operator is able to rotate the control grip 56 until the surface 166 of the disk 94 comes into contact with the surface 168 of the housing 54.

When the control grip 56 is rotated in the opposite direction, indicated by the arrow 72 in FIGS. 7 and 8, the brake cam 96 rotates and the inclined surface 144 pushes the pin 58 in the direction indicated by the arrow 164 in FIG. 8 and the end 172 of the pin 58 operates the hydraulic master cylinder 66 and applies the brake. When the operator releases the control grip, 52 a spring within the hydraulic master cylinder 66 pushes the pin 58 to the right, as indicated by the arrow 162 thereby rotating the brake cam 96 and the control grip 56 to the original position shown in FIG. 7. When the control grip 56 is rotated in the direction indicated by the arrow 72 in FIG. 8, the pin 134 rides in the arcuate slot 130 in the disk 94 and the pin 134 rides in the arcuate slot 130 in the disk 94 and the disk does not rotate. The brake cam 96 includes a small depressed area or detent 146 located between the inclined surface 144 and the flat surface 142. The end 176 of the pin 58 rests in this depressed area 146 when the motorcycle engine is idling and neither the brake nor the throttle are actuated.

The apparatus according to the present invention 10 includes several optional features which are shown in the drawings, it being understood that these features are desirable optional features and are not essential for the operation of the apparatus according to the present invention. The optional features which will now be described are the brake lever 60 and a lock assembly 64.

The brake lever 60 enables an operator who is familiar with conventional brake systems to use the apparatus 10 according to the invention with confidence. The operator can apply the brakes using the brake lever 60 in the manner with which he is familiar and he can gradually transition to using the control grip 56 for application of the brakes as well as application of the throttle. When the operator becomes completely familiar with the use of the control grip 56 for application of both the brakes and the throttle, the brake lever 60 can either be removed using the bolt 178 or alternatively the brake lever 60 can be left on for emergency use or to provide for the use of the motorcycle by additional operators who are not yet familiar with the operation of the apparatus 10 according to the invention.

The brake lever 60 is best shown in FIGS. 2, 4, 7 and 8. An intermediate portion 180 of the brake lever 60 is pivotally mounted on a pair of leg portions 182, 184 by means of a bolt 178 and a nut 186. The leg portions are integrally formed on the housing 54. As is best shown in FIG. 4, the bolt 178 passes through the leg, 184 the brake lever 60 and the leg 182 and is retained by the nut 186. The brake lever 60 has a first end 188 which includes a pair of oppositely directed projecting portions 190,192. When the end 176 of the pin 58 is in the depressed area, 146 as is shown in FIG. 7, a collar 194 which is mounted on the pin 58 bears against the projecting portion 190 causing the brake lever 60 to pivot until the projecting portion 192 bears against the housing 54. The operator can operate the brakes by moving the brake lever 60 to the position shown in broken lines 196 in FIG. 8 thus causing the projection 190 to bear against the collar 194 and force the end 172 of the pin 58 to bear on the hydraulic cylinder 66 thus applying the brakes.

Figure 12:
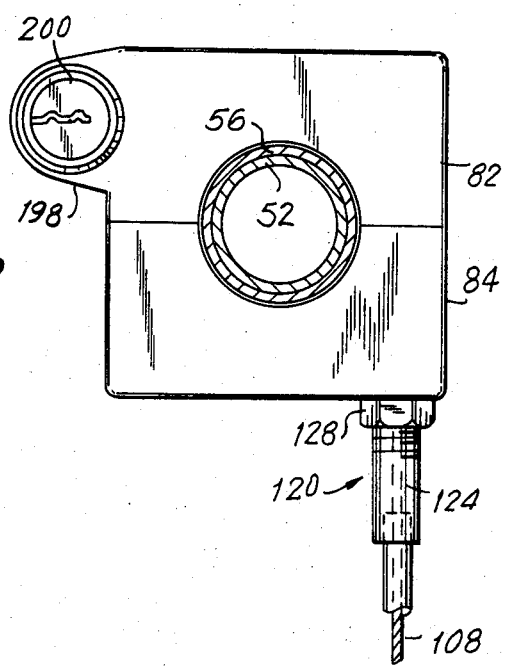
FIG. 12 is a cross sectional view taken along the line 12—12 of FIG. 3.
Figure 13:
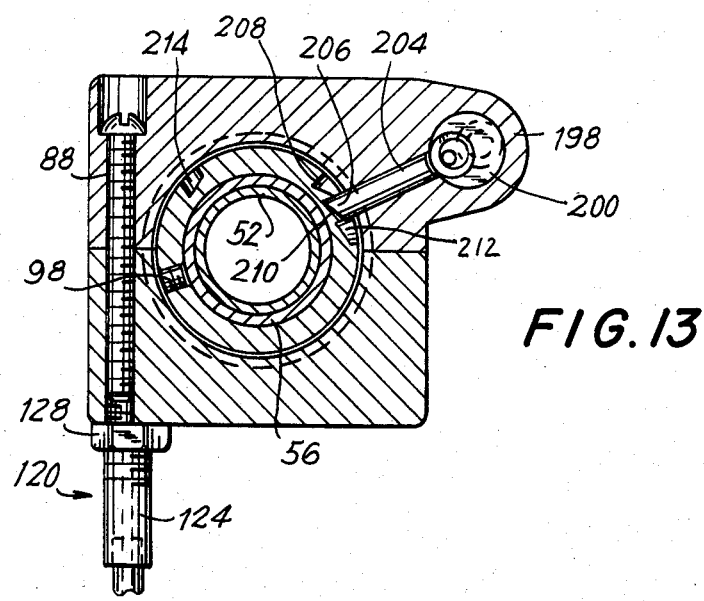
FIG. 13 is a cross sectional view taken along the line 13—13 of FIG. 8.

FIGS. 2, 8, 9, 12 and 13 show a lock assembly 64 which can be used to prevent unauthorized use of a motorcycle on which the apparatus 10 according to the present invention is installed. The lock assembly 64 includes a lock housing 198 which is an integrally formed portion of the housing 54 as is shown in FIGS. 9 and 12. A lock cylinder 200 is mounted in the lock assembly 64 and is operated by a key 202 shown in broken lines in FIG. 8. The lock cylinder 200 actuates a lock operator 204 which is shown in FIG. 13, the end 206 of which can enter one of several detents 208,210,212,214 which are formed in the brake cam 96. When the end 206 of the lock operator 204 is engaged in the detent, 210 the brake cam 96 cannot rotate and the brakes may be locked in the actuated condition thus preventing movement of the motorcycle. Three closely spaced detents 208,210,212 are shown in FIG. 13, thereby enabling an operator to engage and lock the brakes while accommodating slight variations in the pressure of the brake fluid. A fourth detent 214 is provided to enable an operator to lock the brake cam 96 without engaging or actuating the brakes.

As indicated above, the brake lever 60 and the lock assembly 64 are optional features of the invention and the apparatus according to the invention may be constructed without these features.

While a preferred embodiment of the invention has been shown and described herein, it is obvious that numerous additional changes and omissions may be made in such embodiment without departing from the spirit and scope of the invention.

What is claimed is:

1. A throttle and brake control apparatus for a vehicle having a handlebar, a brake system and a throttle system comprising housing means mounted on said handlebar; control grip means rotationally mounted on said handlebar, with said control grip means capable of a first direction of rotation and a second direction of rotation; brake system actuation means mounted on said control grip means and disposed to actuate said brake system responsive to rotation of said control grip means in said first direction of rotation; throttle system actuation means rotatably mounted on said control grip means, for operation of said throttle system responsive to rotation of said throttle system actuation means in said second direction of rotation; and driving connection means mounted on said brake system actuation means for driving said throttle system actuation means in said second direction of rotation when said control grip means is rotated in said second direction of rotation and allowing said throttle system actuation means to rotate freely on said control grip means when said control grip means is rotated in said first direction of rotation thereby enabling said control grip means to selectively control both said brake system actuation means and said throttle system actuation means responsive to the direction of rotation of said control grip means with said brake system actuation means comprising circular face cam means.

2. An apparatus according to claim 1 in which said throttle system actuation means comprises control cable means.

3. An apparatus according to claim 2 in which said throttle system actuation means comprises disk means rotationally mounted on said control grip means, with said driving connection means engaging said disk means and control cable attachment means disposed on said disk means, proximate to the periphery of said disk member, with said control cable means attached to said control cable attachment means for operation of said control cable means responsive to rotation of said disk means.

4. An apparatus according to claim 3 in which said disk means has a center, and further comprises an intermediate portion having an arcuate slot with the radius defining the curvature of said slot originating at said center of said disk means.

5. An apparatus according to claim 4 in which said brake system actuation means comprises cam means mounted on said control grip means.

6. An apparatus according to claim 5 in which said cam means comprises a face cam.

7. An apparatus according to claim 5 in which said cam means comprises a circular cam face mounted on said control grip means proximate to said disk means and attached to said control grip means, for rotation with said control grip means.

8. An apparatus according to claim 7 in which said cam further comprises an inclined portion and a flat portion.

9. An apparatus according to claim 8 in which said cam further comprises a depressed portion disposed between said inclined portion and said flat portion.

10. An apparatus according to claim 7 further comprising projecting pin means with said projecting pin means mounted on said cam and disposed to project into said slot formed in said disk means and with said pin disposed to ride in said slot when said cam rotates in said first direction and to drive said disk means when said cam rotates in said second direction.

11. An apparatus according to claim 6 further comprising a pin member slideably mounted in said housing having a first end bearing against said face cam and a second end bearing against said brake system with said pin member driven to actuate said brake system responsive to rotation of said face cam in said first direction of rotation.

12. An apparatus according to claim 11 in which said cam is disposed to drive said pin member to actuate said brake system when said control grip means is rotated in said first direction of rotation and said disk member is disposed to actuate said throttle system when said disk member is driven by said projecting pin on said cam in said second direction of rotation.

13. An apparatus according to claim 12 in which said cam is capable of a neutral position wherein said first end of said pin member rests in said depressed portion of said cam member and said brake system and said throttle system are not actuated.

14. An apparatus according to claim 1 further comprising locking means, disposed on said housing means, with said locking means capable of a locked position and an unlocked position and capable of reversibly locking said brake actuation means when said brake system is in an actuated state thereby preventing release of said brake system.

15. An apparatus according to claim 14 in which said brake system has a range of actuation and in which said locking means is capable of a plurality of locking positions enabling said apparatus to be locked with a selected degree of actuation of said brake system.

16. An apparatus according to claim 14 in which said locking means comprises a lock cylinder mounted in said housing and a lock operation means mounted in said housing capable of a locked position and an unlocked position responsive to rotation of said lock cylinder and wherein said cam member has a detent portion capable of receiving said lock operator means thereby locking said cam member to said housing when said lock operator means is in said locked position.

17. An apparatus according to claim 16 in which said cam member has a plurality of detent portions, with said cam member capable of being rotated to align a selected detent portion with said lock operator.

18. An apparatus according to claim 1 further comprising brake lever means pivotally mounted on said housing and having a first end and a second end, with said first end disposed to bear on said brake actuation means for actuation of said brake system responsive to motion of said second end.

19. An apparatus according to claim 18 in which said brake lever means is removably mounted on said housing.

20. An apparatus according to claim 18 a pin slideably mounted on said housing and a collar mounted on said slideably mounted pin and with said first end of said brake lever means disposed to bear against said collar in order to actuate said brake system.

* * * * *